United States Patent
Jung et al.

(10) Patent No.: US 9,543,601 B2
(45) Date of Patent: Jan. 10, 2017

(54) FUEL CELL SYSTEM USING HYDROGEN SUPPLY MANIFOLD

(71) Applicant: Hyundai Motor Company, Seoul (KR)

(72) Inventors: Sekwon Jung, Seoul (KR); Bu Kil Kwon, Gyeonggi-do (KR); Hyun Joon Lee, Gyeonggi-do (KR); Yong Gyu Noh, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/717,058

(22) Filed: May 20, 2015

(65) Prior Publication Data

US 2016/0118675 A1    Apr. 28, 2016

(30) Foreign Application Priority Data

Oct. 22, 2014  (KR) .................. 10-2014-0143300

(51) Int. Cl.
*H01M 8/04*    (2016.01)
*H01M 8/24*    (2016.01)

(52) U.S. Cl.
CPC ..... *H01M 8/04097* (2013.01); *H01M 8/04201* (2013.01); *H01M 8/2485* (2013.01); *H01M 2250/20* (2013.01)

(58) Field of Classification Search
CPC ............... H01M 8/04097; H01M 8/04201; H01M 8/2485; H01M 2250/20
See application file for complete search history.

(56) References Cited

U.S. PATENT DOCUMENTS

| 2007/0248858 | A1* | 10/2007 | Blaszczyk | H01M 8/04089 429/415 |
| 2012/0315559 | A1* | 12/2012 | Noh | H01M 8/04097 429/431 |
| 2013/0273448 | A1 | 10/2013 | Fink et al. | |

FOREIGN PATENT DOCUMENTS

| JP | 2009-129814 A | 6/2009 |
| JP | 2012-156033 A | 8/2012 |
| KR | 10-1054837 B1 | 8/2011 |
| KR | 10-2012-0060505 A | 6/2012 |
| KR | 10-2012-0136708 A | 12/2012 |

* cited by examiner

*Primary Examiner* — Gregg Cantelmo
(74) *Attorney, Agent, or Firm* — Mintz Levin Cohn Ferris Glovsky and Popeo, P.C.; Peter F. Corless

(57) ABSTRACT

A fuel cell system having a hydrogen supply manifold is provided and includes a stack that uses supplied air and fuel gas to generate electricity. A recirculation line recirculates a fuel gas, to an inlet of the stack. An ejector unit is disposed on the recirculation line, supplies fresh fuel gas, and circulates the recirculated gas. The ejector unit includes a middle pressure manifold in which a nozzle mounting portion is formed and a supply passage to transmit fuel gas to the nozzle mounting portion. A control valve is disposed on the middle pressure manifold to adjust fuel supplied to the stack. A nozzle is engaged with an end portion of the nozzle mounting portion to inject fuel gas supplied through the supply passage. Additionally, a low pressure manifold is engaged with the middle pressure manifold to suction and mix exhaust gas of the stack.

11 Claims, 5 Drawing Sheets

FUEL CELL SYSTEM USING HYDROGEN SUPPLY MANIFOLD

CROSS-REFERENCE TO RELATED APPLICATION

This application claims priority to and the benefit of Korean Patent Application No. 10-2014-0143300 filed in the Korean Intellectual Property Office on Oct. 22, 2014, the entire contents of which are incorporated herein by reference.

BACKGROUND OF THE INVENTION (a) Field of the Invention

The present invention is related to a fuel cell system having a hydrogen supply manifold that securely supplies a stack with fuel gas and moisture, the stack generates uses the fuel gas and moisture to generate electrical energy, wherein a pressure of hydrogen is decreased to be recirculated and the compact packaging of the recirculation structure is realized.

(b) Description of the Related Art

As known in the related art, a fuel cell vehicle having a fuel cell system supplies a fuel cell stack with hydrogen as fuel so as to generate electricity, and the electricity that is generated by the fuel cell stack operates a motor so as to move a vehicle.

Herein, a fuel cell system does not transform chemical energy of fuel to combustion heat and is a electricity generation system that transforms chemical energy of fuel to electrical energy through electrochemical process.

The fuel cell system supplies a fuel electrode (anode) of a fuel cell with high purity of hydrogen from a hydrogen storage tank and uses an air supply device such as an air blower to supply an air electrode (cathode) of a fuel cell with atmosphere air.

Thus, the hydrogen that is supplied to a fuel cell stack is divided into a proton and an electron, the divided hydrogen ion is supplied to an air electrode (cathode) through a high molecule electrolyte film, oxygen that is supplied to an air electrode combines with an electron that comes in an air electrode to form moisture, and then the electrical energy is generated therein.

Generally, a fuel cell vehicle uses electricity that is generated by reacting hydrogen and oxygen in a stack so as to operate a motor such that a vehicle can be moved. For this purpose, it is necessary to supply a stack with a predetermined pressure of hydrogen.

Also, it is necessary to large amount of hydrogen so as to increase a flying distance of a fuel cell vehicle, and therefore a fuel cell vehicle uses a high pressure hydrogen tank having hundreds of pressure in a fuel cell vehicle.

Accordingly, a plurality of valves and regulators are disposed to decrease pressure of hydrogen between a hydrogen tank and a stack, and a plurality of pipes and manifolds are used to connect them respectively.

However, the more the portions connecting parts, the higher the possibility of hydrogen leak, and also O ring and sealing members are necessary so as to keep air-tightness, the cost is increased, and the productivity is deteriorated.

Also, because points that is to be measure a leak after the manufacturing and maintenance of the system is increased, air-tightness test time and cost are increased. In addition, when a fitting and tubing is used to configure a gas supply line, connecting portions are increased, and it is hard to use an automatic device to assemble them and to manage an assembly torque. Accordingly, fuel cell vehicle has been making makes an effort to decrease connecting portions/volume of a hydrogen supply system (fuel processing system) having a valve and a regulator.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a fuel cell system having a hydrogen supply manifold having advantages of making a hydrogen supply system be compact and reducing leaking points such that maintenance becomes easy.

As described above, a fuel cell system having a hydrogen supply manifold according to an exemplary embodiment of the present invention may include a stack configured to use air and fuel gas to generate electricity, a recirculation line that recirculates a fuel gas, which is partially used by the stack to be exhausted, to an inlet of the stack, and an ejector unit that is disposed on the recirculation line, supplies fresh fuel gas, and recirculates stack exhaust fuel gas, wherein the ejector unit may include a first pressure manifold where a nozzle mounting portion is formed at one side and a supply passage is formed to deliver fuel gas to the nozzle mounting portion, a control valve that is disposed on the first pressure manifold to control fuel that is supplied to the stack, a nozzle that is engaged with an end portion of the nozzle mounting portion to injects fuel gas that is supplied through the supply passage, and a second pressure manifold that is engaged with the first pressure manifold, formed a chamber to house the nozzle mounting portion and the nozzle, a venturi and a diffuser in a direction that the fuel gas is injected from the nozzle, sucks exhaust gas of the stack, mixes the exhaust gas and the fuel that is injected from the nozzle, and emits the mixed gas through the venture and the diffuser.

The nozzle mounting portion may be integrally extended in a lower side and the control valve is disposed on an upper portion of the first pressure manifold.

The nozzle may be disposed on a side surface of a lower end portion of the nozzle mounting portion.

The control valve may include a valve coil that is disposed along an exterior circumference, and a plunger that is disposed in the valve coil, wherein the plunger is moved by a power that is transmitted to the valve coil, and a front end portion of the plunger controls opening rate of the supply passage and flow rate of the fuel gas.

A cut-off valve may be disposed at an upstream side of the control valve so as to close the supply passage.

The supply passage may be integrally formed in the first pressure manifold.

A purge passage that is connected to the chamber may be integrally formed in the first pressure manifold or is integrally extended from the first pressure manifold, and a purge valve is disposed on the first pressure manifold to close the purge passage.

The purge passage may be connected to the chamber and be formed in an upper direction, and a purge portion is integrally formed or is integrally extended from a side surface of the first pressure manifold to exhaust purge gas that is purged by the purge valve.

A regulator connection portion may be integrally formed on the first pressure manifold to receive fuel gas from a high pressure regulator.

The first pressure manifold and the nozzle mounting portion may be made of metal material and the nozzle is made of polymer material.

An insulation layer may be interposed between the nozzle mounting portion and the nozzle to reduce heat transfer.

In accordance with the present invention for realizing the objects, a second pressure manifold where venturi tube and a diffuser are formed is disposed on a first pressure manifold, a nozzle is disposed through a nozzle mounting portion of the first pressure manifold, high pressure of hydrogen is supplied through the first pressure manifold, a control valve is disposed on the first pressure manifold, and therefore the overall structure becomes compact.

Also, a cut-off valve or a purge valve is disposed on the first pressure manifold, a purge route is formed in the first pressure manifold, and therefore the overall structure becomes compact and simultaneously the maintenance becomes easy.

DETAILED DESCRIPTION OF THE EMBODIMENTS

An exemplary embodiment of the present invention will hereinafter be described in detail with reference to the accompanying drawings.

Figure 1:
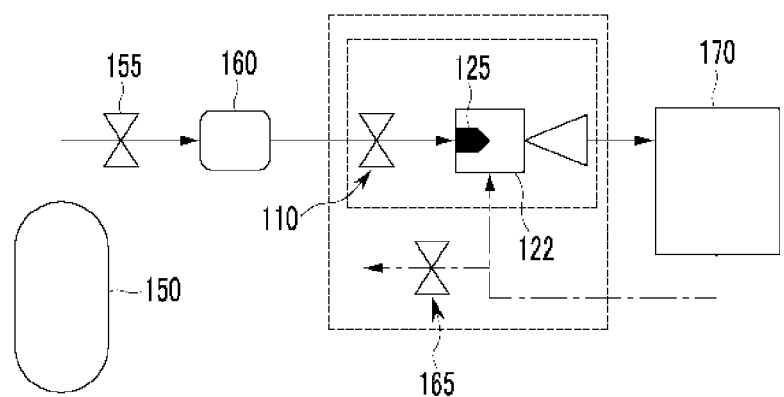
FIG. 1 is a schematic diagram of a fuel cell system according to an exemplary embodiment of the present invention.

FIG. 1 is a schematic diagram of a fuel cell system according to an exemplary embodiment of the present invention.

Referring to FIG. 1, a fuel cell system includes a hydrogen tank 150, a cut-off valve 155, a high pressure regulator 160, a control valve 110, a nozzle 125, an ejector 122, a purge valve 165, and a stack 170.

Hydrogen gas as a fuel is stored in the hydrogen tank 150 under high pressure, and the cut-off valve 155 can completely close a hydrogen supply line. The high pressure regulator 160 reduces the high pressure hydrogen to a predetermined pressure, and the control valve 110 controls the hydrogen that is supplied to the nozzle 125.

The ejector 122 mixes hydrogen injected by the nozzle 125 and the recirculated fuel gas, the mixed gas passes a venturi 210 and a diffuser 212, and the purge valve 165 purges moisture or unnecessary gas to an outside from a recirculation line.

The fuel cell system requires hydrogen and oxygen so as to generate current from the stack 170. In this case, only theoretical reaction amount of hydrogen is supplied to the stack 170, hydrogen concentration is deteriorated at an late stage of the reaction, uniformity of the fuel gas hydrogen is deteriorated, performance and stability of the stack is deteriorated, and thus excessive amount of hydrogen is supplied thereto.

However, when one part that the excessive hydrogen that is supplied to the stack 170 reacts with oxygen and the other part thereof is exhausted to the outside, fuel consumption efficiency is deteriorated, and thus the exhaust gas, which reacts in the stack 170 and is exhausted, recirculates to be mixed with fresh hydrogen, and the mixed gas is supplied to the stack such that the fuel efficiency is improved.

Also, in a case that the exhaust gas of the stack 170 recirculates, moisture of the recirculation gas can prevent an electrolyte film of the stack 170 from being dried.

A pump is necessary so as to pump the exhaust gas of the stack 170. Generally, a regeneration motorized blower or an ejector 122 is used to recirculate the exhaust gas.

The ejector 122 injects fluid having a pressure at high speed, a vacuum is formed around the injected fluid, and the vacuum condition sucks the surrounding fluid, which can be called a fluid pump.

The ejector 122 includes a nozzle 125 that injects operating fluid (hydrogen) at high speed, sucks a secondary gas (anode exhaust gas), and includes a venturi 219 that mixes the hydrogen and the exhaust gas and a diffuser 212 that decreases the fluid moving speed and increases the pressure of the fluid.

Figure 2:
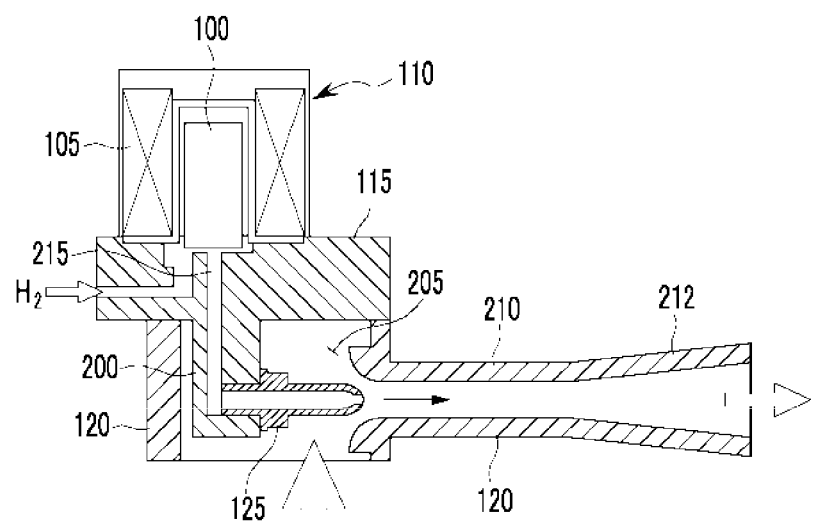
FIG. 2 is a schematic cross-sectional view of a hydrogen supply manifold configured in a fuel cell system according to an exemplary embodiment of the present invention.

FIG. 2 is a schematic cross-sectional view of a hydrogen supply manifold configured in a fuel cell system according to an exemplary embodiment of the present invention.

Referring to FIG. 2, the ejector 122 includes a first pressure manifold 115, a nozzle 125, and a second pressure manifold 120, and a venturi 210 and a diffuser 212 are integrally extended in a horizontal direction from the second pressure manifold 120.

A supply passage 215 is formed inside the first pressure manifold 115 to supply hydrogen, and a nozzle mounting portion 200 is integrally extended in a lower side from a center portion of a lower surface of the first pressure manifold 115.

The nozzle 125 is mounted on a side surface of a lower end portion of the nozzle mounting portion 200, and the nozzle 125 can inject hydrogen gas toward the venturi 210 and the diffuser 212.

The control valve 110 is mounted on an upper portion of the first pressure manifold 115, and the control valve 110 includes a plunger 100 and a valve coil 105 that is disposed along an edge circumference.

The plunger 100 can move up and down by the power that is supplied to the valve coil 105, and a front end portion of the plunger 100 can selectively close the supply passage 215.

The lower pressure manifold 120 is mounted on a lower portion of the first pressure manifold 115, and a chamber 205 is formed in the second pressure manifold 120 to house the nozzle mounting portion 200 and the nozzle 125. The chamber 205 is connected to a passage of the venturi 210 and the diffuser 212.

In an exemplary embodiment of the present invention, hydrogen gas is supplied through the supply passage 215 of the first pressure manifold 115, if the control valve 110 is opened, the hydrogen gas is injected by the nozzle 125 of the chamber 205 toward the venturi 210 and the diffuser 212 such that the vacuum pressure is formed in the chamber 205, and thus the exhaust gas of the stack 170 is sucked from a lower side of the chamber and hydrogen gas is supplied to a fuel electrode of the stack 170 from the diffuser 212.

Figure 3:
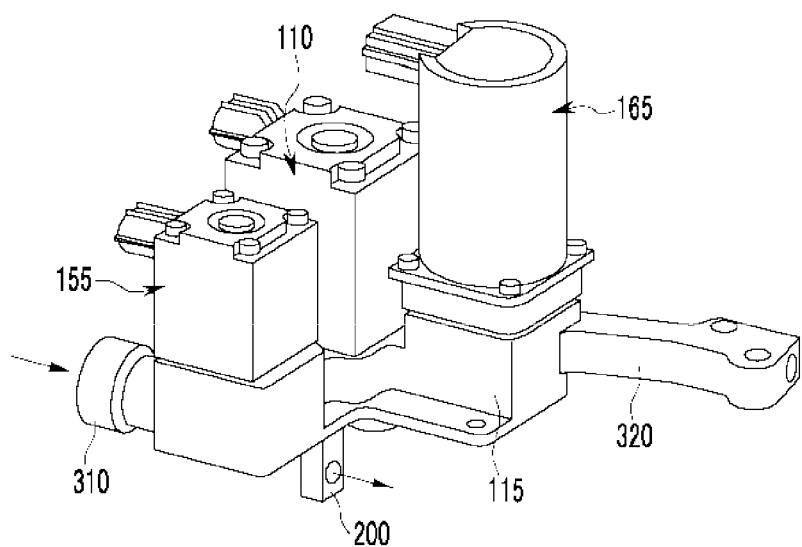
FIG. 3 is a schematic perspective view of a hydrogen supply manifold configured in a fuel cell system according to an exemplary embodiment of the present invention.

FIG. 3 is a schematic perspective view of a hydrogen supply manifold configured in a fuel cell system according to an exemplary embodiment of the present invention.

Referring to FIG. 3, the cut-off valve 155, the control valve 110, and the purge valve 165 are disposed at an upper portion of the first pressure manifold 115, and the nozzle mounting portion 200 is integrally extended from a lower central portion of the first pressure manifold 115.

A regulator connection portion 310 is integrally formed at one side surface of the first pressure manifold 115 to receive hydrogen gas from the hydrogen tank 150 and the high pressure regulator 160, and a purge portion 320 is integrally extended from the other side surface of the first pressure manifold 115, wherein the purge portion where the gas is purged by the purge valve 165.

In an exemplary embodiment of the present invention, the lower pressure manifold 120 is mounted at a lower portion of the first pressure manifold 115, the cut-off valve 155, the control valve 110, and the purge valve 165 are disposed at an upper portion of the first pressure manifold 115 such that the maintenance becomes easy and overall structure can be configured to be compact.

Figure 4:
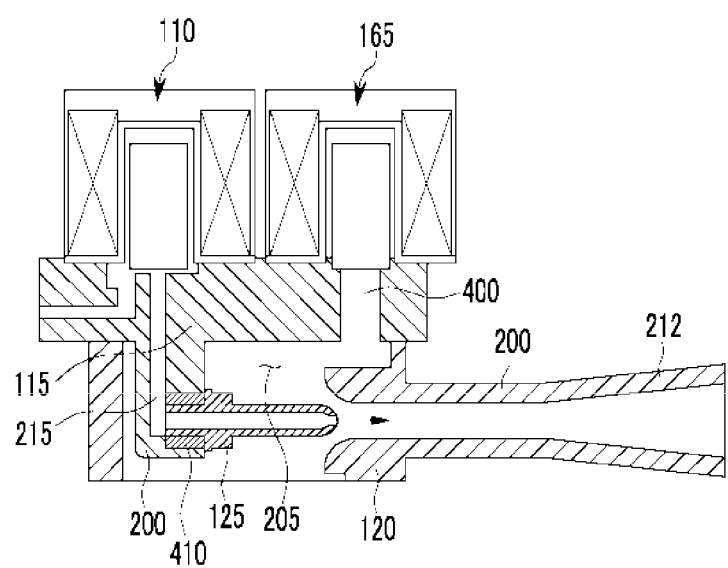
FIG. 4 is a schematic cross-sectional view of a hydrogen supply manifold according to an exemplary embodiment of the present invention.

FIG. 4 is a schematic cross-sectional view of a hydrogen supply manifold according to an exemplary embodiment of the present invention.

Referring to FIG. 4, the nozzle mounting portion 200 and the nozzle 125 are disposed in the chamber 205, and the chamber 205 is connected to a purge passage 400. The purge passage 400 is extended in an upper side. And, the purge valve 165 is disposed at an upper portion of the purge passage 400, and the purge valve 165 can selectively close the purge passage 400.

An inlet of the purge passage 400 is formed near a tip of the nozzle 125 and is formed at an upstream side of the diffuser 212 to be able to prevent the moisture from flowing into the purge valve 165 and to be able to prevent the freezing of the purge valve 165.

In an exemplary embodiment of the present invention, the cut-off valve 155 can be separately disposed depending on the design specification, and the purge valve 165 and the control valve 110 can be disposed at a side surface.

Further, referring to FIG. 4, an insulation layer 410 is formed between the nozzle mounting portion 200 and the nozzle 125. The nozzle 125 and the nozzle mounting portion 200 of the first pressure manifold 115 are insulated by the insulation layer 410 such that the freezing of the nozzle 125 can be prevented.

Figure 5:
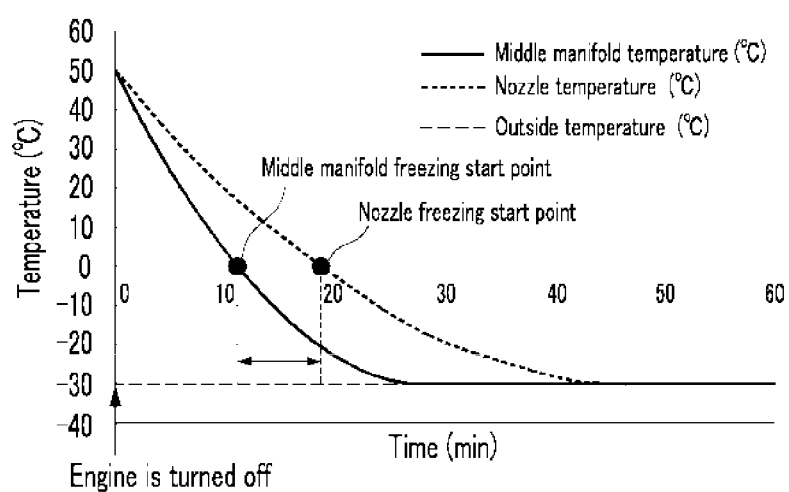
FIG. 5 is a graph showing a temperature of a hydrogen supply manifold according to an exemplary embodiment of the present invention.

FIG. 5 is a graph showing a temperature of a hydrogen supply manifold according to an exemplary embodiment of the present invention.

Referring to FIG. 5, a horizontal axis denotes time, and a vertical axis denotes temperature. Particularly, the temperature denotes a temperature of the first pressure manifold 115 and the nozzle 125.

When the hydrogen supply manifold is exposed to a temperature of minus 30 degrees Celsius, a temperature of the first pressure manifold 115 is rapidly decreased, and a temperature of the nozzle 125 is relatively slowly decreased.

That is, the first pressure manifold 115 is exposed to an relatively outside, however, the nozzle 125 of the nozzle mounting portion 200, which is formed in the first pressure manifold 115, is disposed inside the chamber 205, and the assembly portion between the nozzle and the nozzle mounting portion is made of a material, which has a lower heat transfer rate (for example, polymer material) such that a temperature decrement speed is low, although an outside temperature is low.

And, an interior surface of the first pressure manifold 115 is condensed first of all, the nozzle 125 is relatively not condensed, and thus the nozzle is not obstructed and the nozzle can safely inject hydrogen in a low temperature.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| <Description of symbols> | |
| --- | --- |
| 100: plunger | 105: valve coil |
| 110: control valve | 115: middle pressure manifold |
| 120: low pressure manifold | 125: nozzle |
| 122: ejector | 150: hydrogen tank |
| 155: cut-off valve | 160: high pressure regulator |
| 165: purge valve | 200: nozzle mounting portion |
| 205: chamber | 210: venturi |
| 212: diffuser | 215: supply passage |
| 310: regulator connection portion | 320: purge portion |
| 400: purge passage | 170: stack |

What is claimed is:

1. A fuel cell system having a hydrogen supply manifold, comprising:
    a stack configured to use air and fuel gas to generate electricity;
    a recirculation line that recirculates a fuel gas, which is partially used by the stack to be exhausted, to an inlet of the stack; and
    an ejector unit that is disposed on the recirculation line, supplies fresh fuel gas, and recirculate stack exhaust fuel gas;
    wherein the ejector unit includes:
    a first pressure manifold where a nozzle mounting portion is formed at one side and a supply passage is formed to deliver fuel gas to the nozzle mounting portion;
    a control valve that is disposed on the first pressure manifold to control fuel that is supplied to the stack;
    a nozzle that is engaged with-the nozzle mounting portion to inject fuel gas that is supplied through the supply passage; and
    a second pressure manifold that is engaged with the first pressure manifold, formed a chamber to house the nozzle mounting portion and the nozzle, a venturi and a diffuser in a direction that the fuel gas is injected from the nozzle, sucks exhaust gas of the stack, mixes the exhaust gas and the fuel that is injected from the nozzle, and emits the mixed gas through the venturi and the diffuser,
    wherein the nozzle mounting portion is integrally extending in a lower side from a center portion of a lower surface of the first pressure manifold.

2. The fuel cell system of claim 1, wherein the control valve is disposed on an upper portion of the middle pressure manifold.

3. The fuel cell system of claim 2, wherein the nozzle is disposed on a side surface of a lower portion of the nozzle mounting portion.

4. The fuel cell system of claim 1, wherein the control valve includes;
    a valve coil that is disposed along an exterior circumference; and
    a plunger that is disposed in the valve coil, wherein the plunger is moved by a power that is transmitted to the valve coil, and a front end portion of the plunger controls opening rate of the supply passage and flow rate of the fuel gas.

5. The fuel cell system of claim 1, wherein a cut-off valve is disposed at an upstream side of the control valve so as to close the supply passage.

6. The fuel cell system of claim 4, wherein the supply passage is integrally formed in the first pressure manifold.

7. The fuel cell system of claim 1, wherein a purge passage that is connected to the chamber is integrally formed in the first pressure manifold or is integrally extended from the first pressure manifold, and a purge valve is disposed on the first pressure manifold to close the purge passage.

8. The fuel cell system of claim 7, wherein the purge passage is connected to the chamber and is formed in an upper direction, and a purge portion is integrally formed or is integrally extended from a side surface of the first pressure manifold to exhaust purge gas that is purged by the purge valve.

9. The fuel cell system of claim 1, wherein a regulator connection portion is integrally formed on the first pressure manifold to receive fuel gas from a high pressure regulator.

10. The fuel cell system of claim 1, wherein the first pressure manifold and the nozzle mounting portion are made of metal material and the nozzle is made of polymer material.

11. The fuel cell system of claim 1, wherein an insulation layer is interposed between the nozzle mounting portion and the nozzle to reduce heat transfer.

* * * * *